No. 632,394. Patented Sept. 5, 1899.
H. K. BAYNES.
PROCESS OF DECOMPOSING ALKALI NITRATES.
(Application filed Feb. 10, 1896.)
(No Model.)
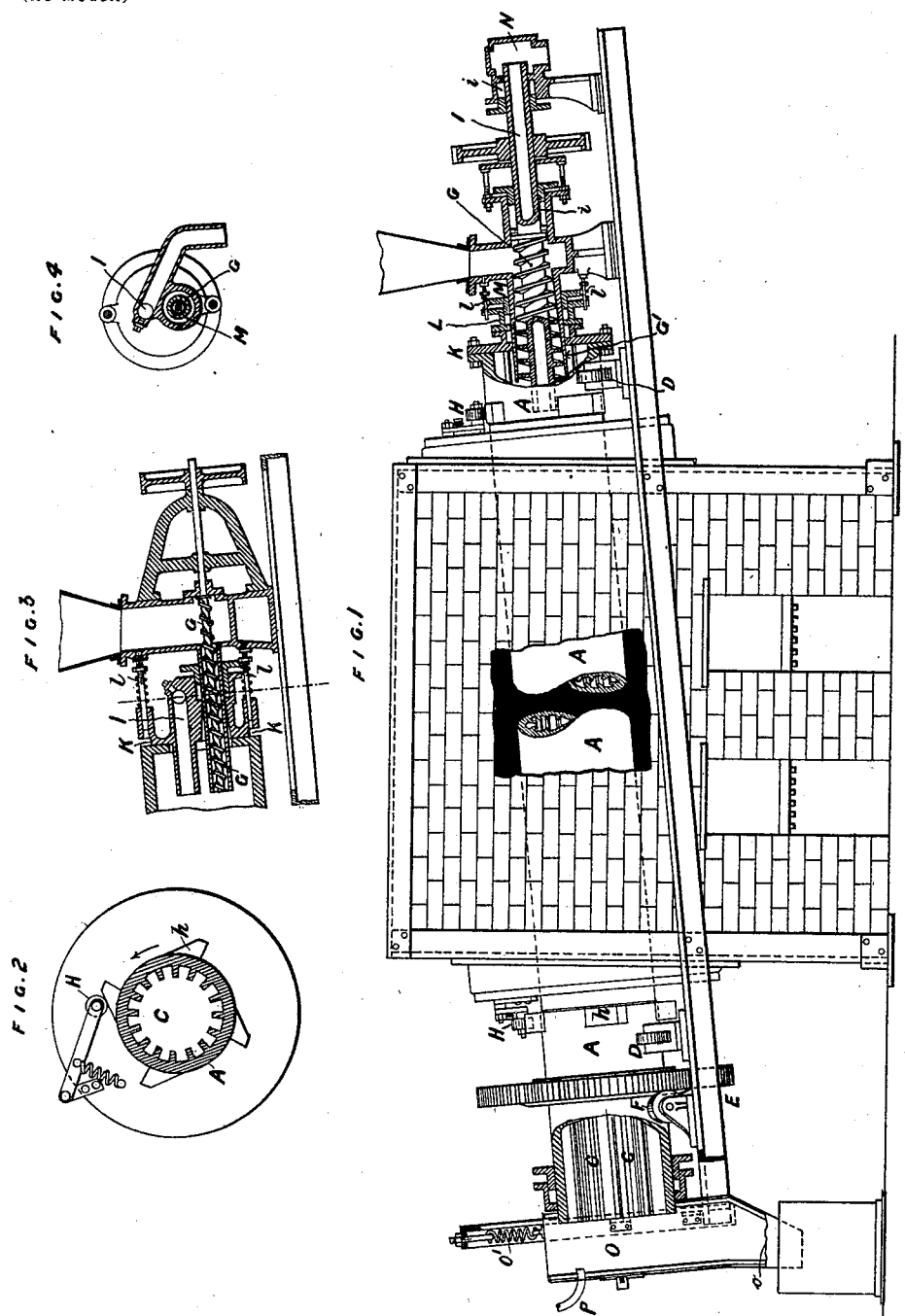

UNITED STATES PATENT OFFICE.

HENRY KENNETT BAYNES, OF LONDON, ENGLAND, ASSIGNOR TO THE FOREIGN CHEMICAL AND ELECTROLYTIC SYNDICATE, LIMITED, OF SAME PLACE.

PROCESS OF DECOMPOSING ALKALI NITRATES.

SPECIFICATION forming part of Letters Patent No. 632,394, dated September 5, 1899.

Application filed February 10, 1896. Serial No. 378,633. (No specimens.)

*To all whom it may concern:*

Be it known that I, HENRY KENNETT BAYNES, gentleman, of 3 Whitehall Place, London, S. W., England, have invented a new and Improved Process for the Decomposition of Alkaline Nitrates, of which the following is a full, clear, and exact description.

This invention relates to the process of decomposing alkali nitrate, either for the purpose of producing nitric acid and caustic alkali or for the purpose of recovering the nitric acid used to form alkali nitrate in the process of making chlorine and obtaining caustic alkali as a by-product, which was described in the specification of previous Letters Patent of the United States of America, dated the 23d day of August, 1892, No. 481,407.

The decomposition is in any case effected by subjecting the nitrate in intimate admixture with ferric oxide, to heat in such manner as to produce a copious evolution of nitrous fumes, and form an alkaline ferrite convertible into ferric oxide and caustic alkali. It has heretofore been endeavored to effect the decomposition of the nitrate by subjecting the mixture to the action of heat not only externally, but also internally, by blowing heated air or air and steam through the mass; but all attempts to so furnace the mixture of nitrate and oxide in the mass in a stationary retort have resulted in the fluxing of the greater part of the nitrate, which by accumulating in the fluxed condition at the lower part of the retort renders the mixture non-homogeneous and for the greater part impermeable to the heated current, thus rendering the reaction very partial and incomplete, and therefore impracticable on a commercial scale. Not only is the reaction incomplete when it is attempted to treat the mixture in the mass, but even when treating a comparatively small quantity it is found, notwithstanding that it may be kept constantly in motion by raking over or by turning over in a revolving horizontal retort, that the undecomposed particles gradually become more and more isolated by the solid products, resulting from the reaction of the particles which have been most exposed to the heat, and therefore less and less acted on, so that the progress of the reaction becomes more and more retarded, and therefore more and more difficult to carry to completion.

The present invention consists of a continuously acting method, whereby every individual particle of the mixture is exposed on all sides to repeatedly renewed contact with heated surfaces, so that all clogging or massing of the mixture is avoided, and the solid products of the decomposition are carried away, and thus prevented from hampering the reaction of the undecomposed particles, and thus the reaction is rendered most perfect and complete, and is accompanied by the greatest possible evolution of nitrous fumes.

The furnacing of the intimate mixture of finely-divided ferric oxide and alkaline nitrate is effected by subjecting the mixture in a loose pulverulent condition and in small quantities to frequently-repeated contact with the surface of the retort, which is maintained at a red heat, or at a temperature of about 650° centigrade, the particles adhering to the retort being detached at each transfer from one hot surface to another and the solid product of the decomposition being removed from the zone of action and discharged as the reaction proceeds, so that it cannot interfere mechanically with the reaction of the portions still undecomposed.

The operation is preferably performed in a cast-iron retort such as represented in the accompanying drawings, forming part of this specification, wherein—

Figure 1 is a longitudinal elevation of the retort and furnace, partly broken away to show the interior; and Fig. 2 is a cross-section of the retort. Figs. 3 and 4 are detail sections showing a modification.

The retort A is heated to a cherry-red heat, or to a temperature of about 650° centigrade, by a furnace within which it is revolved, the retort being provided internally with longitudinal ribs or projections C to raise the particles in its revolution and allow them to fall, so as to bring them repeatedly into contact with fresh surfaces, the retort being slightly inclined from the horizontal, so as to cause the particles to travel slowly through the retort by repeatedly falling to and fro across the retort, as above mentioned. The retort is mounted upon roller-bearings D, arranged externally of the furnace, and it is driven by spur or other suitable gear E and supported against end thrust by rollers F.

The forcible detachment and showering down of those particles which by partial fluxing become liable to adhere to the sides of the retort are brought about by the effect of intermittent jarring or shock produced by the blows of hammers H, which are periodically raised by wipers $h$, turning with the retort and allowed to fall on the retort in its revolution, two hammers actuated alternately by two sets of wipers being employed.

An Archimedean screw conveyer G receives the mixture from a hopper and feeds it into the upper end of the retort at a rate commensurate with the rate of progress of the mixture through the retort. The nitrous fumes as fast as they are evolved are swept out by air (or air and steam) forced into the retort at the lower end, whereby the fumes are conveyed through an outlet I at the upper end of the retort to the usual condensers and other apparatus employed for recovering the fumes as commercial nitric acid. The outlet-pipe I for the air and gases may either be formed by the spindle of the screw conveyer G, which in that case projects, together with the casing G', in which it works, axially into the upper end of the retort, as in Fig. 1, or the outlet-pipe may be separate from and above the conveyer, as in Figs. 3 and 4.

In order to allow for the free expansion of the retort by heat and yet maintain a sufficiently tight joint to withstand the internal pressure of the gases, an end face-joint is made at K between the flanged upper end of the retort and a spring-pressed part L, provided with stuffing-box and gland M, through which the casing G' of the screw conveyer passes into the retort. The spring-pressed part L may be in the form of a collar, as in Fig. 1, surrounding the conveyer-casing G', which is turned cylindrical externally to admit of the longitudinal sliding motion of the stuffing-box upon it, the collar being pressed up by these springs $l$ to keep the face-joint K air-tight. The joint between the rotating and stationary part of the retort being thus made by turned metallic rubbing-faces in a plane perpendicular to the axis no side binding in consequence of unequal expansion of the retort by the heat can occur, since there is perfect freedom for lateral deviation of the retort, there being ample clearance between the screw-casing G' and the retort, while between the stuffing-box M and the screw-casing G', which are both stationary parts, the only motion which takes place is the slight longitudinal one to allow for expansion and contraction. In this way is maintained the perfectly tight joint necessary to admit of internal air-pressure being used to sweep out the fumes.

The tubular spindle I of the screw conveyer works in ordinary stuffing-boxes $i$ $i$ and is driven by any suitable gear. It opens into a stationary box N, whence a pipe conveys the gases to the condensing plant. In Figs. 3 and 4 the outlet I is separate from the conveyer, both being mounted in a cover L, making a spring-pressed face-joint with the end of the retort as in the former case.

The lower end of the retort passes through a stuffing-box into a chamber O, provided with a spout $o$, which dips into any suitable receiver, wherein the solid product of the decomposition which is still in a pulverulent state is received, the matter therein collected serving to seal the mouth of the spout against the escape of gas. To allow for any possible unequal expansion of the retort by the heat, the chamber O is suspended freely by springs O', or otherwise supported, so as to be free to yield to any deviation of the retort and so prevent leakage of gases and side binding of the retort in the stuffing-box.

P is the inlet for air or air and steam blown in under sufficient pressure to carry the fumes off as fast as they are generated.

The ultimate product of complete decomposition is an alkaline ferrite which is subsequently decomposed by heating it with water, whereby ferric oxide is obtained for use over again, while the alkaline base enters into solution and is recovered as caustic alkali by evaporation in the ordinary way.

In conclusion it may be mentioned that the ferric oxide employed should be as pure as possible in order that pure caustic alkali may be obtained. As regards the proportion of ferric oxide in the mixture, it must be sufficient to prevent the nitrate from fluxing when furnaced—say two of oxide to one of nitrate, the proportion being, however, subject to variation according to the physical properties of the oxide.

As regards the rate of feed, it has been found that with a retort eighteen inches in diameter, having a length of six feet exposed to the furnace at an inclination equal to a rise of one inch in the foot and revolving at a rate of four to five revolutions per minute, the rate of feed for the mixture corresponding to twenty-five to thirty pounds nitrate of soda—$i.$ $e.$, seventy-five pounds to ninety pounds mixture—per hour, has given excellent results; but the invention is in no way limited in this respect, these being merely working directions, which would necessarily vary according to circumstances.

I claim—

1. The herein-described continuous method of decomposing alkali nitrate in admixture with ferric oxide, which consists in subjecting the pulverulent mixture in the form of a thin stream, film, or layer, to frequently-repeated contact with different heated surfaces maintained at substantially the temperature described and free from the mixture, the solid products of decomposition being continuously carried out of the path of the undecomposed particles, substantially as specified.

2. The herein-described continuous method of decomposing alkali nitrate in admixture with ferric oxide, which consists in subjecting the pulverulent mixture in the form of a thin stream, film, or layer, to frequently-repeated contact with different heated surfaces maintained at substantially the temperature described and free from the mixture, the solid products of decomposition being continuously carried out of the path of the undecomposed particles and sweeping out the nitrous fumes as fast as they are generated, by blowing fluid into the retort, as specified.

HENRY KENNETT BAYNES.

In presence of—
T. J. OSMAN,
JOSEPH LAKE.